Aug. 14, 1951

V. E. PRATT ET AL 2,564,274

FILM PROJECTOR WITH MOTOR DRIVEN
FILM FEEDING MECHANISM

Filed Dec. 26, 1946

INVENTORS
VERNEUR E. PRATT
GEORGE F. GRAY

BY
Van Deventer & Grier

ATTORNEYS

INVENTORS
VERNEUR E. PRATT
GEORGE F. GRAY
BY
Van Deventer & Grier
ATTORNEYS

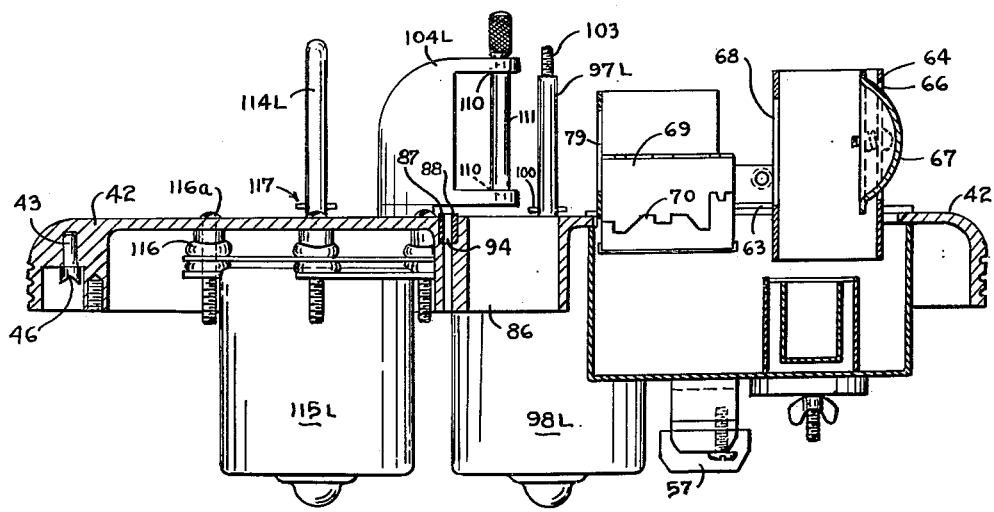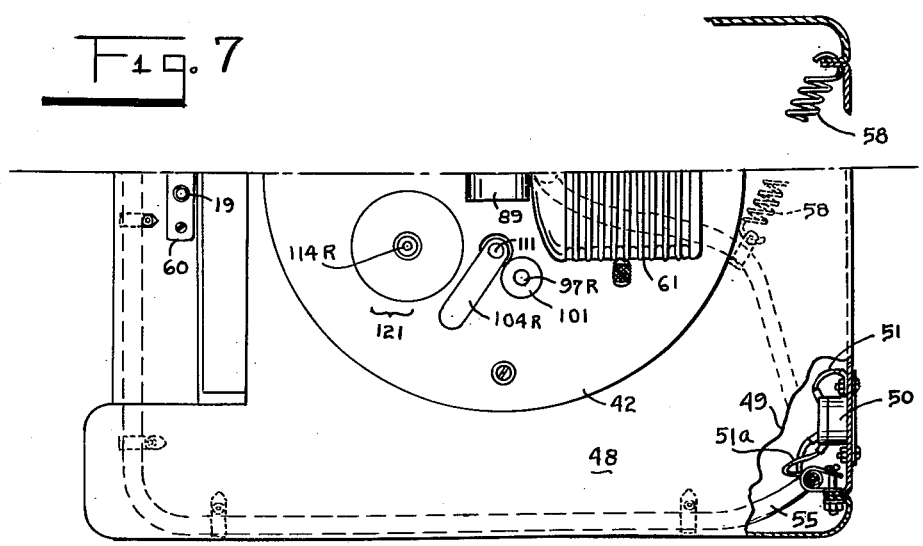

Aug. 14, 1951
V. E. PRATT ET AL
2,564,274
FILM PROJECTOR WITH MOTOR DRIVEN
FILM FEEDING MECHANISM
Filed Dec. 26, 1946
8 Sheets-Sheet 6
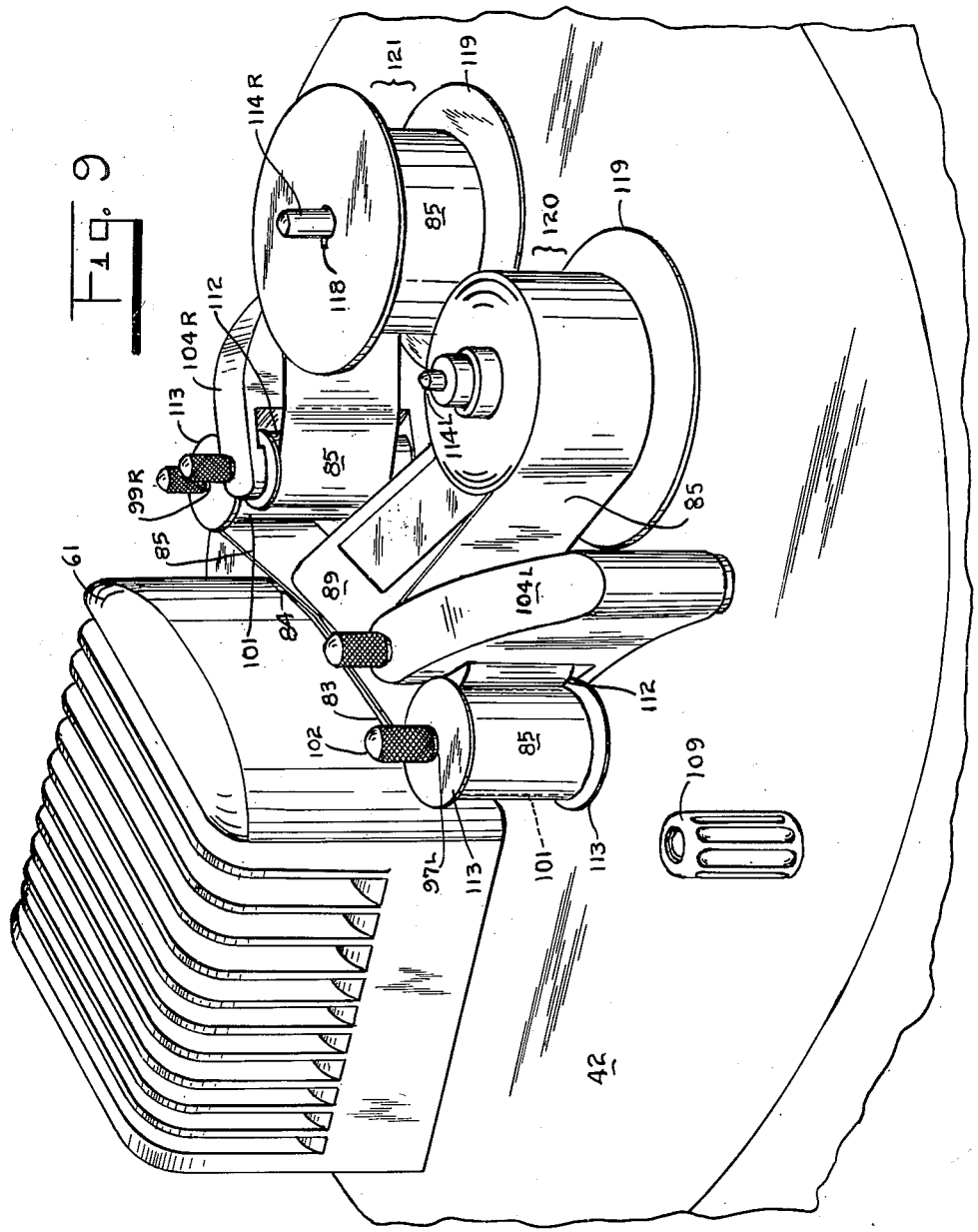
INVENTORS
VERNEUR E. PRATT
GEORGE F. GRAY
BY
*Van Deventer & Grier*
ATTORNEYS

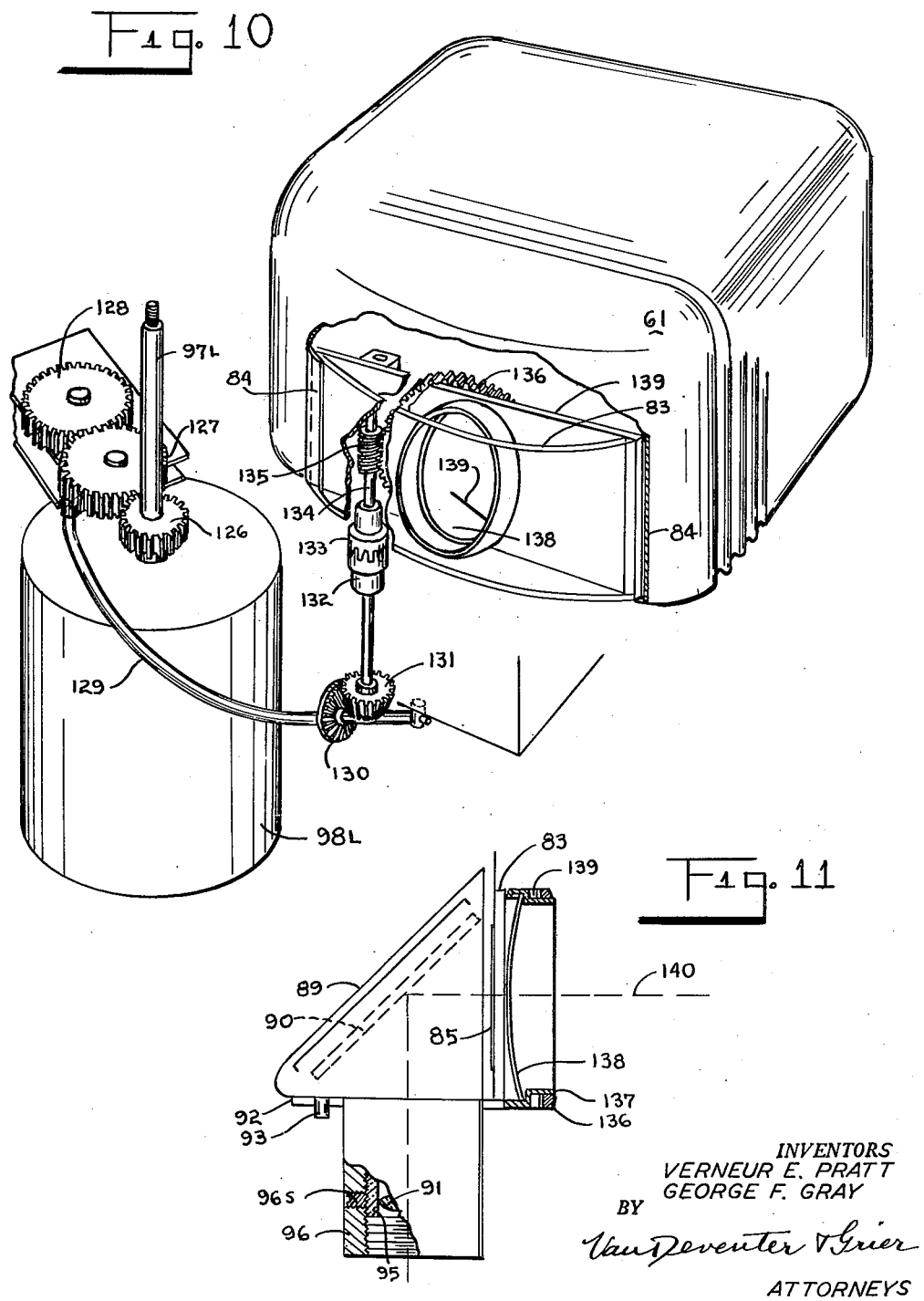

INVENTORS
VERNEUR E. PRATT
GEORGE F. GRAY
BY
*Van Deventer & Grier*
ATTORNEYS

Patented Aug. 14, 1951

2,564,274

UNITED STATES PATENT OFFICE 2,564,274

FILM PROJECTOR WITH MOTOR-DRIVEN
FILM FEEDING MECHANISM

Verneur E. Pratt and George F. Gray,
Norwalk, Conn.

Application December 26, 1946, Serial No. 718,378

23 Claims. (Cl. 88—24)

This invention relates to improvements in projectors and is directed more particularly to the provision of a reading machine for microfilm or the like (hereinafter termed a "Reader"), including means for producing enlarged prints of any desired frame.

The present application discloses an improved form of reader embodying some of the features disclosed in the copending applications for patents:

Serial Number 539,740—filed June 10, 1944, now patent No. 2,412,551, dated December 10, 1946.

Serial Number 581,354—filed March 7, 1945.

Serial Number 700,924—filed October 3, 1946, now patent No. 2,493,998, dated January 10, 1950, which will be referred to more in detail hereafter.

An object of the invention is the provision of a reader having a pair of motors for driving the film feeding means, as disclosed in the application Serial Number 539,740 aforesaid, in combination with another pair of motors driving reeling means, whereby the film moved across the optical path of the lens by said feeding means may be wound and unwound on reels that are driven independently of the film feed.

Another object is the provision of a reader as disclosed in the application Serial Number 581,354, wherein the film gate or pressure plate is mounted in an improved manner.

Other objects are the provision of a reader as disclosed in the aforesaid applications Serial Number 581,354 and Serial Number 700,924, wherein the turret plate has an improved mounting; wherein an improved lens mounting is employed; and, where tensioning devices are provided between the feeding means and the reeling means to insure uniform tension on the film supported on the pressure plate.

Further objects are the provision of a reader wherein the turret plate is provided with a terminal rack on which all circuits to the apparatus carried by the plate terminate, and to which rack a cable is connected having conductors connecting to the apparatus located in the cabinet of the device. This makes possible the separate testing and assembly of the turret and the cabinet and the quick connection of same.

Yet another object is the provision of a reader having an auxiliary pressure plate which is easily substituted for the standard plate ordinarily used, said auxiliary plate carrying means for determining the length of a film run through the reader and therefor affording an index by means of which any particular image on the film may be quickly located.

All of the foregoing objects are more fully hereinafter referred to together with other objects and advantages in connection with the following description of a preferred embodiment of the device by way of illustrating the invention. It will be understood, however, that many variations in the described construction can be made without, however, departing from the invention, which is defined by the appended claims.

In the accompanying drawings:

Figure 5 is a view partly in section of the turret on the line 5, 5 of Figure 4;

Figure 7 is a top view, partly in section, of the reader shown in the preceding figures;

Figure 9 is a perspective view of the turret of the reader shown in the preceding figures;

Figure 10 is a diagrammatic view of a film indexing attachment for the reader;

Figure 11 is a sectional view on the line 11, 11 of Figure 10;

Figure 1:
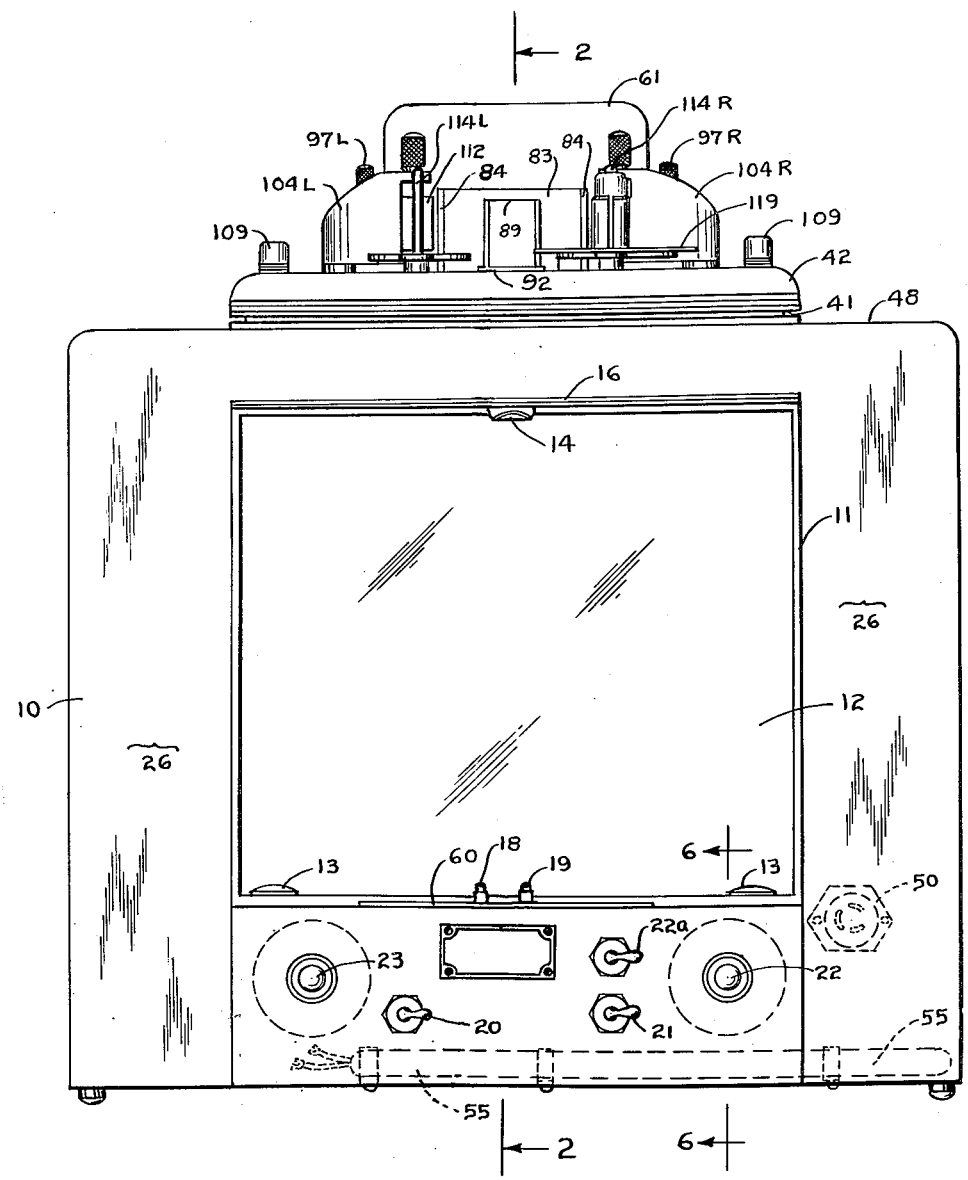
Figure 1 is a front elevational view of a reading machine embodying the invention.

Referring to Figure 1, the numeral 10 denotes a casing forming a cabinet, the front portion 11 of which is indented or recessed to support the viewing screen 12. The screen is removably positioned in the casing in any suitable manner, such as by springs 13, 14, Figure 2, engaging the top and bottom edges of the screen. By pressing downward on the outwardly extending end of spring 14, the spring is released from the dimple 15 in the upper edge portion 16 of the cabinet, and the screen may be lifted out of the front wall opening therein.

The lower front portion 17 of the cabinet may be a formed member that extends forwardly below the screen between the side portions 26 of the cabinet, and mounted therein within convenient reach of the user are the control switches 18, 19, 20, 21, 22a, and resistor knobs 22, 23, to be presently described.

The front portion 17 of the cabinet has a transverse back plate 24 secured thereto and to the base plate 25 of the cabinet, whereby 17 is stiffened to form a rigid support for screen 12 and may be secured to the base plate 25 by screws 24a. The arrangement just described for mounting the control switches and resistors permits them to be mounted within and between the outwardly extending vertical side portions 26 of the cabinet, so that the handles of these devices do not project beyond the plane of the front of the cabinet. The plate 24 may have a cut-out portion to permit access therethrough to the control devices and the terminal rack 38, therefor, to be presently described.

A first surface mirror 27 is carried on a framework 28, mounted on screws 29, secured to the base plate 25. By adjusting the locking nuts 30 between which the framework 28 is secured, the face of the mirror 27 may be adjusted at various angles to the horizontal in a manner that will be obvious.

A double faced surface mirror 31 is pivoted at its lower end 32 to the base plate 25 and is supported by two side arms 33 pivoted to the base plate at 34. The arms are slotted as shown at 35, and by means of the nuts 36 and lugs 37 secured to the mirror 31, the latter can be adjusted to the positions referred to in connection with the description of Figure 3 hereinafter given.

The upper edge 16 of the cabinet is turned inwardly all around the upper edge of the cabinet to form a circular opening 39 in the top thereof. Surrounding this opening and secured to the inturned edges 40 thereof is a member 41 forming a circular track for the turret plate generally denoted by the numeral 42.

The track 41 is of inverted V-section as shown, and the turret plate 42 is supported thereon by a three point mounting comprised of the steel inserts 43, 44, 45, spaced 120° apart and having their lower ends grooved as shown at 46, Figure 5, to fit the track 41.

Figure 2:
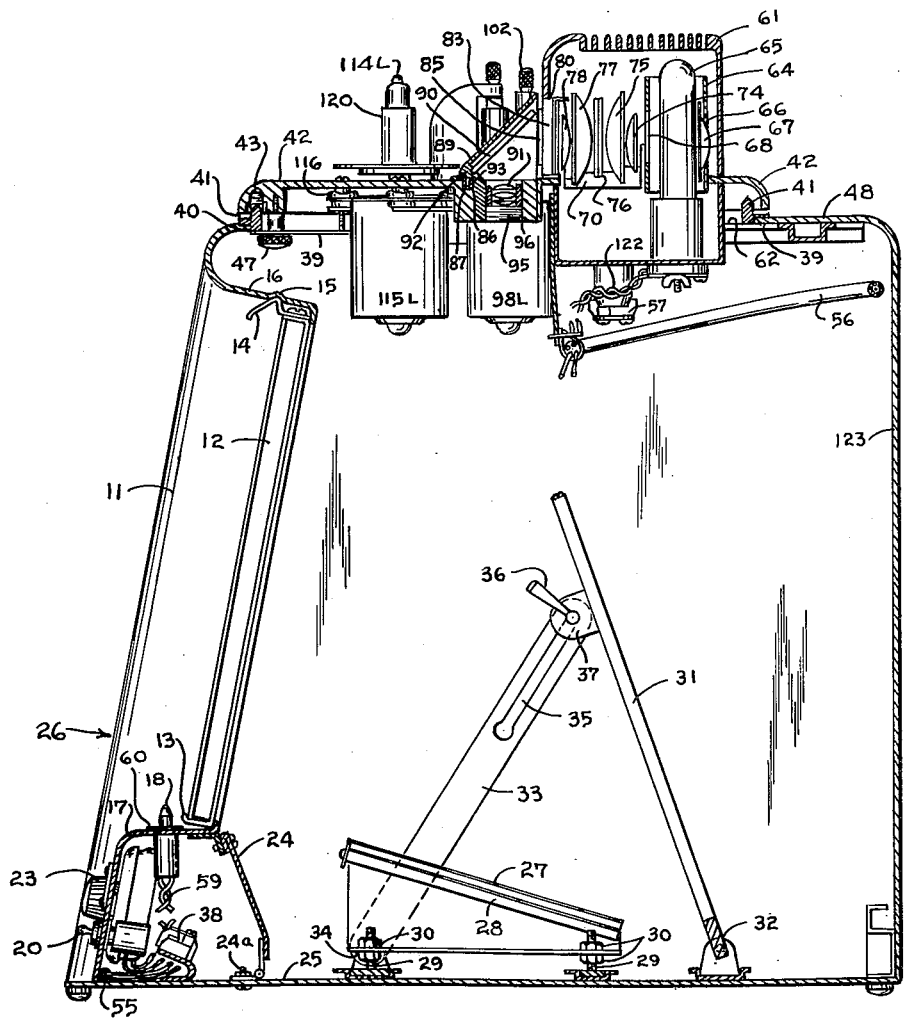
Figure 2 is a sectional view of the reader on the line 2, 2—Figure 1.

The turret plate 42 is prevented from rising up off the track 41 by the shouldered screws 47, the heads of which fit under the track 41 as best seen in Figure 2. This arrangement permits the turret to be easily and smoothly revolved on the track while held in working position thereon without lateral motion or motion parallel to its axis.

Referring to Figure 7, the top wall 48 of the cabinet is broken away at 49 to show the lower left hand corner of the reader, looking at same from the rear. In this corner is located a socket 50 to receive the usual plug for attaching the reader to the current supply. This socket can be located at any convenient place in the reader cabinet and is connected to the controls, lamp, motors, etc., as explained in connection with the circuit diagram Figure 13 hereof.

Figure 13:
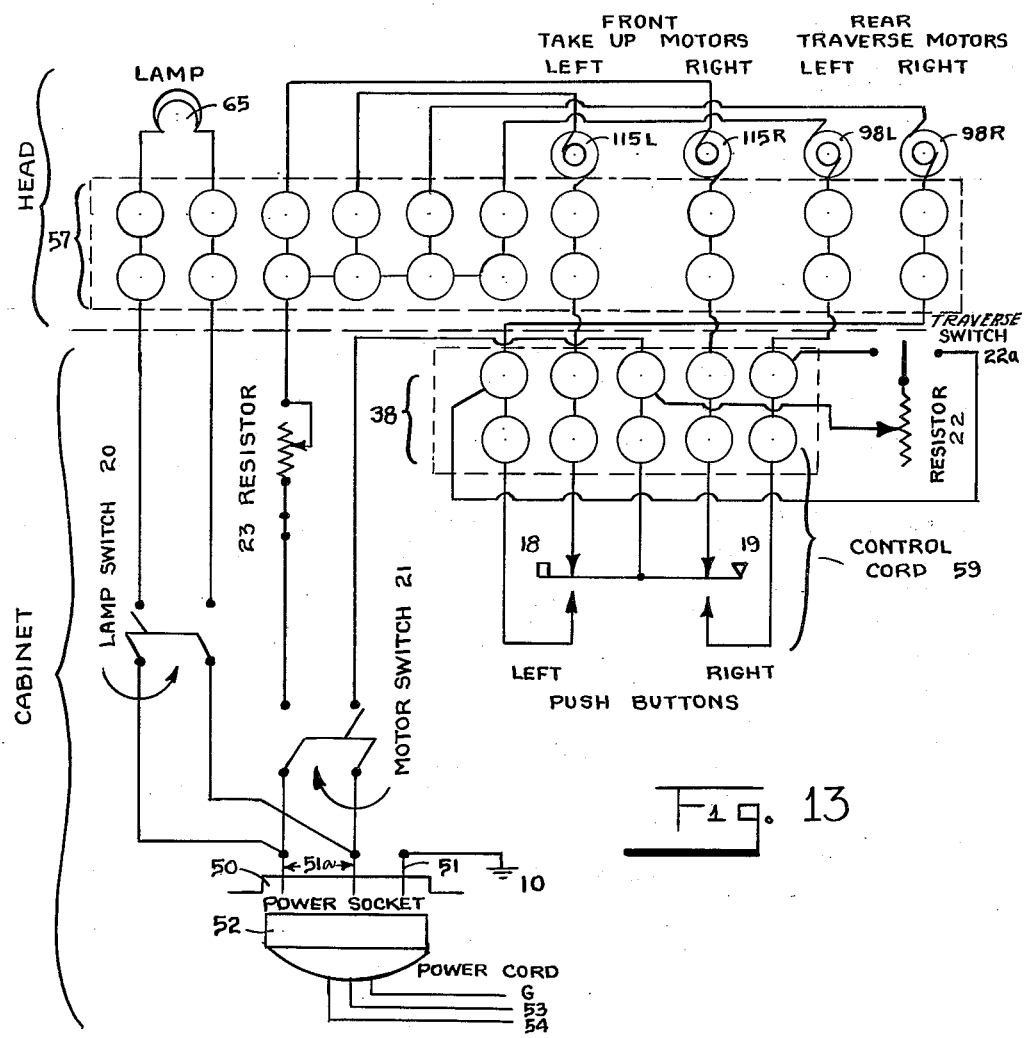
Figure 13 is a circuit diagram of the reader shown in the preceding figures.

The socket may be of the usual three conductor variety and is provided with a grounding connection 51 in metallic connection with the metallic casing of the reader, which connection is carried through the connecting plug 52 to G, Figure 13, wherein 53, 54 are the plug conductors connecting to the current supply.

A cable 55 is secured along the bottom of cabinet 10 on a side thereof, as shown in Figure 7, and one end of this cable terminates in the lower front 17 of the cabinet, and the conductors of the cable connect to rack 38 therein and to switches 20, 21, 22a, and the resistors controlled by knobs 22, 23.

The cable extends to the rear of the cabinet and has conductors 51a connecting to socket 50. The cable now extends upwardly in the rear left corner of the cabinet (looking at same from the rear), and then extends across the cabinet in the upper portion thereof as shown at 56, Figure 2. The upper end thereof terminates on the terminal rack 57 secured to the bottom of turret plate 42.

A spring 58 is secured to the bight of the cable 55 to prevent the slack of same from falling downward toward mirror 31 as the turret is moved.

The pushbuttons 18, 19 are mounted in any suitable manner so they can be withdrawn from the front 17 of the cabinet and are provided with flexible conductors, or a five conductor cord 59, which connects to the terminal rack 38.

When the buttons are in place in the cabinet, as shown in Figures 1 and 2, the cord 59 may lie within the lower front of the cabinet at 17, and the user manipulates the buttons while sitting upright before the reader. However, should the user wish to lean back and assume a relaxed position in front of the reader, or even lie down while using same, he can do so by withdrawing the buttons from the casing and manipulating them while held in the hand, this arrangement effecting what may be termed a "remote control" for the reader. If desired, the cord 59 may be wound up by any suitable spring tension reel device (not shown) and located within the cabinet.

The buttons 18, 19 may be mounted on a plate 60 which snaps into a suitable opening or depression in the top edge of the lower front 17 of the cabinet.

The turret head will now be described. The turret plate 42 carries a lamp house 61, supported thereon in any suitable manner, said plate having an opening 62 therethrough over which is placed a mounting plate 63 carrying a chimney 64 for the lamp 65. The chimney is apertured at 66 to receive a reflector 67 for the lamp. The chimney is also apertured at 68 to permit egress of light from the lamp.

Lens mounting blocks 69, 70 are mounted in a casing 71 having flanges 72 slotted as shown at 73 whereby the casing and lens block may be mounted on plate 42 and adjusted horizontally along the beam of light from the lamp.

The lens block carries, in proper relatively adjusted positions, the lens 74, the condenser lens 75, the heat glass 76, and the condenser lens 77.

A mask 78 is fixed in front of lens 77 in the usual position occupied by such masks.

The front of casing 71 has a rectangular opening 79 therein, and the upper edge of this casing is engaged by the lower edge 80 of the lamp house. The casing 71 has inwardly extending sides 81 which overlie the pads 82, which are carefully machined to have the proper height to support the pressure plate or film gate 83.

The pressure plate 83 is described in detail in the aforesaid copending application Serial Number 581,354, but in the instant application this plate has an improved mounting. Here the plate made of glass or other transparent material has its ends shaped to lie against the flat sides 81 of the casing 71 against which the plate is held by springs 84.

Figure 4:
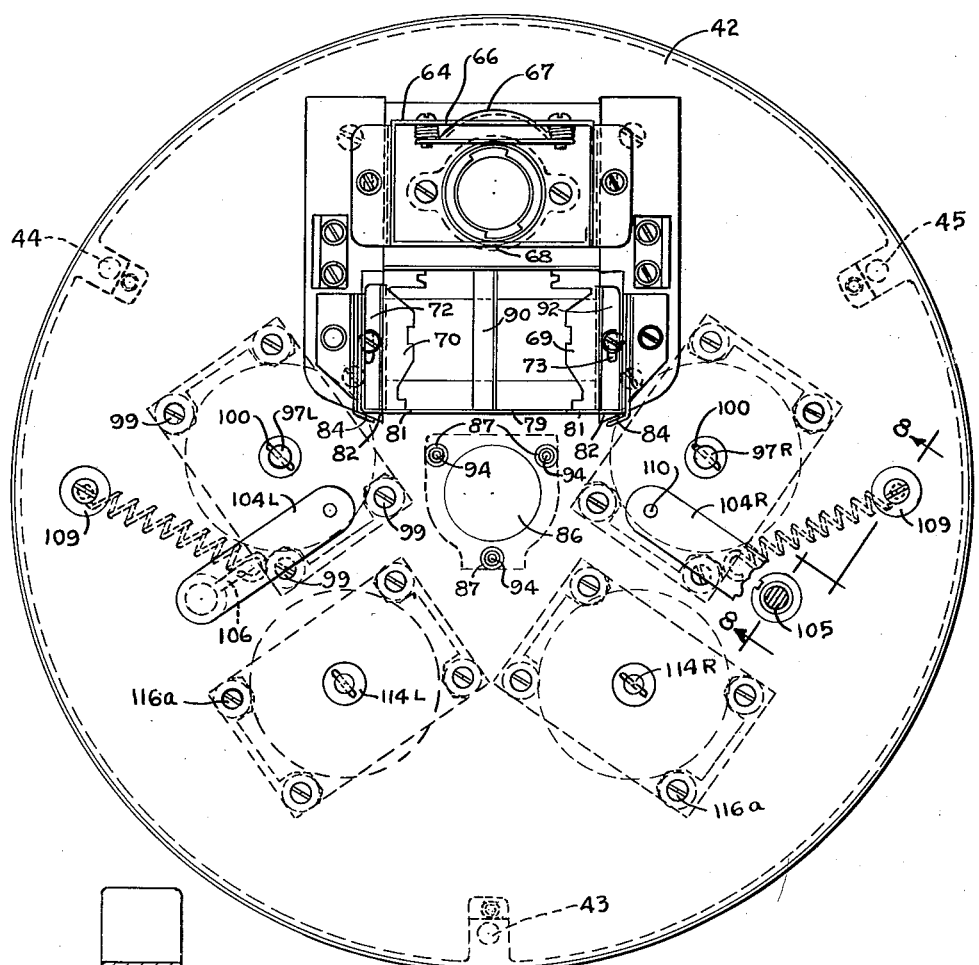
Figure 4 is a view looking down on the turret of the reader shown in the preceding figures with some of the parts removed.

As best seen in Figure 4, the plate 83 of Figure 2 (not shown in Figure 4) can be pushed downward behind the springs 84 until the lower horizontal edge of the ends of the plate rests on pads 82. As the plate 83 has accurate dimensions on all four sides, it may be reversed; yet, because of the mounting arrangement as shown, the mid-portion of same will always lie on the axis of the optical system, and the plate although slightly curved, presents a practically flat field for the portion of the film 85 supported thereby to be projected.

The turret plate 42 has an axially aligned hole 86 therethrough. Suitably spaced about this hole are three hollow mounting studs 87 which have accurately ground upper faces and which are press-fitted to plate 42 so that the upper faces 88 of these studs lie in a true horizontal plane slightly, say .015" above the upper surface of the plate 42.

A mirror-objective lens unit comprising a casing 89, a mirror 90, and a lens 91 is mounted upon studs 87.

The casing 89 is provided with a flange 92 carrying three downwardly projecting hardened and ground pins 93, which engage the holes 94 in the studs 87. The outline of this flange is shown about the studs 87 in dotted lines in Figure 4.

This three-point mounting of the lens casing 89 permits same to be readily removed from the turret head when it is desired to change the mirror 90 or lens 91 for any reason as the user can keep on hand several units and interchange as desired, yet maintaining the high accuracy of alignment necessary.

The mirror 90 is fixed in the casing 83 in such a manner as to reflect the horizontal beam of light from the lamp 68 downward through the lens 91.

The lens 91 is mounted in a tubular mount 95, which is in threaded engagement with the interiorly threaded bore of the neck 96 of the casing 89.

The lens, once having been focused and adjusted in its tubular mount 95, the latter is mounted in the casing 89 and properly focused. The mount 95 is then secured in such adjusted relation to the casing 89 by any suitable means such as the set screw 96s, Figure 11, positioned in the wall of the neck 96 and engaging the lens mount 95 as shown. Thus the lens is in fixed position and does not require refocusing when the unit 83 is removed and replaced on the turret.

The feeding means for moving the film 85 transverse the optical path of the reader includes the shaft 97L and 97R, rotatably mounted in suitable bearings in the turret plate 42; or, if preferred, these may be the shafts of the driving motors 98L, 98R mounted on the under side of plate 42 in suitable anti-vibration supports, the supporting screw for one of these being shown at 99, Figure 4. These are similar to the supports 116, more fully shown in Figure 5. The shafts 97R and 97L may have pins 100 therein adapted to fit the usual slot (not shown) in the lower end of the tubular shaft of feeding rollers 101 having a suitable resilient outer driving surface engaging the film. The rollers are driven by the shafts with which they are associated and are held in place thereon by the knobs, such as 102, Figure 2, in threaded engagement with the upper ends 103 of the shafts.

The shafts 97L and 97R are perpendicular to the surface of the plate 42 and parallel, but spaced apart from the axis of the lens 91 in such a manner that the film 85 fed by the rotation of these shafts will be held firmly against the outer surface of the pressure plate 83, making what is a substantially vertical line contact, the width of which will depend upon the curvature of the plate 83. Thus the film is positioned in the path of the lens for projection.

Figure 8:
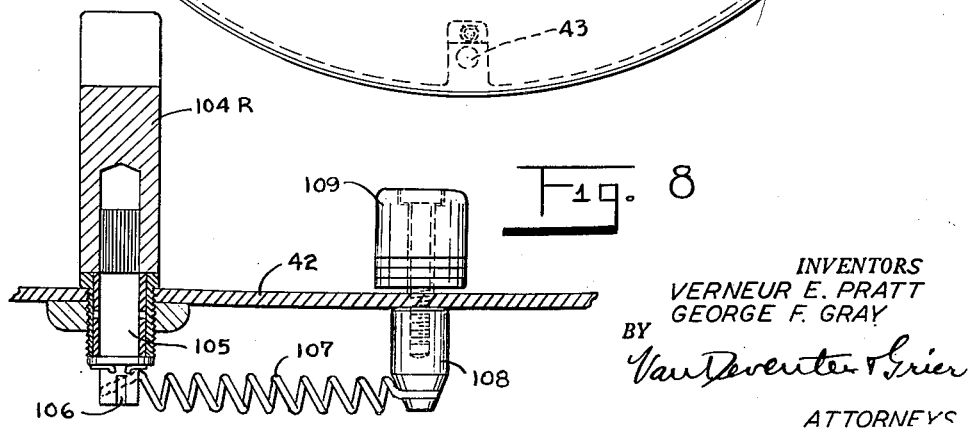
Figure 8 is a sectional view on the line 8, 8 of Figure 4.

Immediately in front of the feeding rollers 101 is positioned the film tensioning devices comprising the yoke arms 104L, 104R having shafts 105 supported in suitable bearings in plate 42. These shafts each have an extension at the bottom, as best seen in Figure 8, from which a short lever 106 extends horizontally.

A spring 107 has one end hooked over a pin in 106 and the other end secured to a post 108 extending downward from the plate 42. A knob 109 may be mounted on the upper end of the pin or bolt and may be used to rotate the entire turret on the casing 10.

The horizontally extending arms of the yokes 104L, 104R are drilled as shown at 110 to receive the shafts 111, which support the rollers 112 having a suitable resilient outer driving surface engaging the film.

The rollers 112 fit between the heads or flanges 113 of the feeding rollers 101, so that the film 85 is gripped and held between the resilient surfaces of rollers 101 and 112, gripping pressure being applied by the yokes 104L, 104R carrying rollers 112 as previously described. The yokes and their associated rollers 112 are drawn toward the rollers 101 by the action of springs 107 so that the film is gripped with a yielding pressure which can be predetermined by the characteristics of the springs 107.

Reeling means is associated with the feeding means for the film as just described. This reeling means winds up the film 83 when it is moved in either direction, right or left. Normally the left hand reel unreels the film and the right hand reel rolls it up, but obviously the film can be traversed in the opposite direction.

Shafts 114L, 114R are rotatably mounted in suitable bearings in the turret plate 42; or, if preferred, these may be the shafts of the driving motors 115L, 115R mounted on the underside of plate 42 in suitable anti-vibration supports 116 held to the plate 42 by screws 116a.

The shafts 114L, 114R may have pins 117 therein adapted to fit the usual slot 118 in the heads 119 of the reels generally indicated by the numerals 120, 121, so that when the shafts are revolved, they rotate the reels supported thereon. The circuit terminals of the four motors and lamp previously described are each equipped with a flexible connecting cord. One of such cords is shown at 122, Figure 2, and these ten conductors connect to the upper row of terminals on rack 57, as shown in Figure 13, so that the turret head can be fully wired and tested without having any loose wires extending therefrom or the necessity of making temporary separate connections directly to the motor and lamp terminals, and without mounting the turret on any particular cabinet. This facilitates manufacture and testing as the head forms a complete manufacturing unit separate from the cabinet, mirrors and controls, having the quick detachable circuit connections at the rack 57, which are easily masked and to which snap connections for testing can easily be made.

If the cabinet 10 is made with a solid back 123 as shown in Figure 2, then the mirror 31 will adjust the image reflected to screen 12. However, by making an aperture as shown at 124 in Figure 3 in the rear wall 123, the reader may be used to make photographic prints on sensitized paper 125 positioned at said opening as described in connection with the copending application Serial Number 700,924 beforementioned. The paper pad as described in the copending application Serial Number 613,648, filed on August 30, 1945 may be used in the improved reader herein described, and the mirrors 27, 31 can be adjusted to give the best results when using screen 12 or paper 125.

Figure 3:
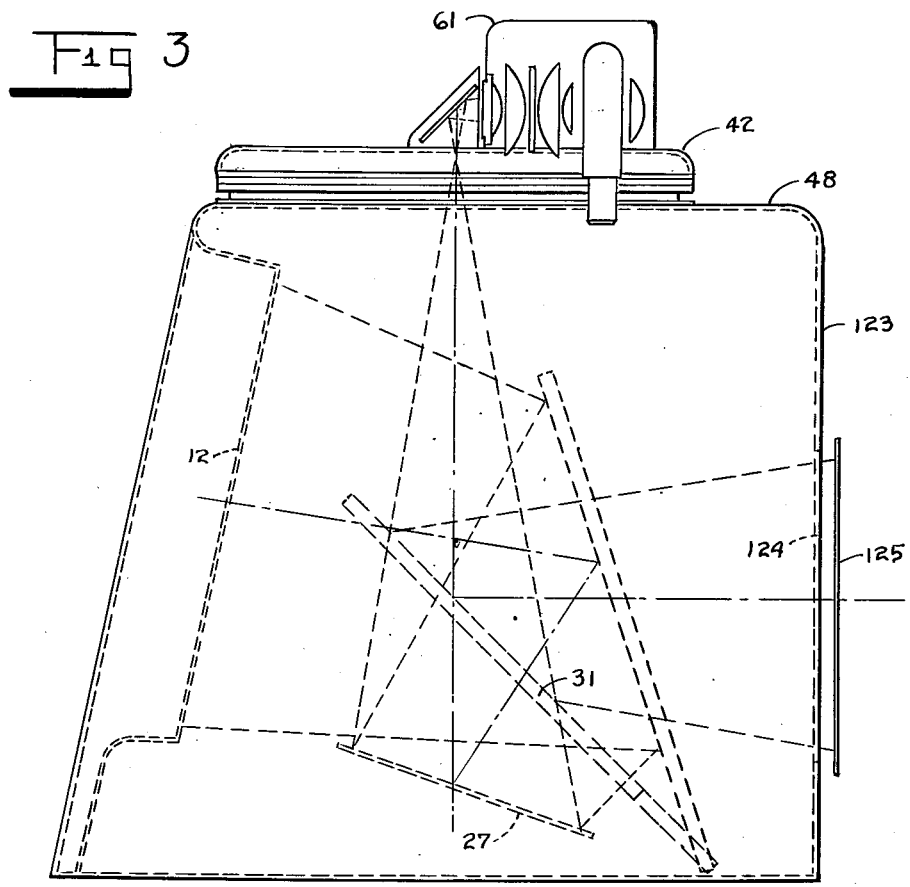
Figure 3 is a diagrammatic sectional view of a modified form of the reader shown in Figures 1 and 2.
Figure 6:
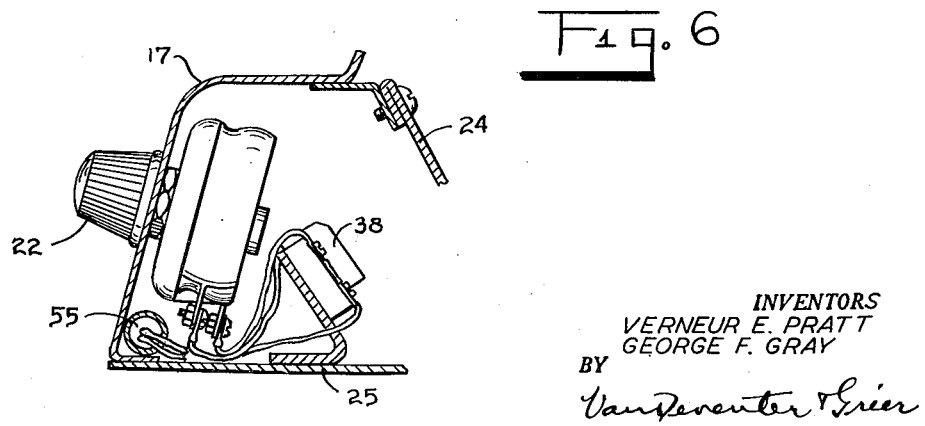
Figure 6 is a sectional view on the line 6, 6 of Figure 1.

When the mirror 31 is in the position shown in solid lines, Figure 3, the image is projected to paper 125, and the mirror 27 is not used. When the mirror 31 is moved to the position shown in dotted lines, the image is projected to screen 12 and both mirrors 27, 31 are used.

The indexing attachment or footage indicator for the reader just described will now be seen in Figures 10 and 11. This may be termed an optical film index, as it enables any image on the film to be located by optical means.

Referring to Figure 10, one of the feeding shafts, such as 97L, is connected via suitable gearing 126, 127, 128, flexible shaft 129 and bevel gears 130, 131 with a quick-detachable coupling 132, 133, to drive a shaft 134 having a worm 135.

The worm 135 engages a worm ring gear 136 secured to a hollow hub 137 in which is supported a reticule 138 having a fine solid line 139 forming a pointer engraved thereon. The glass reticule can be omitted and the pointer 139 can be attached to gear 136 to rotate therewith, if desired.

The reticule 138 and gear 136 are mounted to rotate in a bearing aperture in plate 139, forming part of the pressure plate unit and having the pressure plate 83 for supporting film 85, as previously described.

The indexing attachment is positioned in the optical path 140 of the reader by placing the unit behind springs 84 in front of the lamp house 61, as previously described. This is simplified by employing the coupling 132, 133, which operates in a manner that is obvious to permit the unit to be instantly attached to the gearing 131. The ratio of the gearing just described is such that for every hundred feet of film moved across the optical path 140 of the reader, gear 136 will make one complete revolution and consequently the image of pointer 139 projected to screen 12 will make one revolution about the screen. The pointer 139 it will be observed is immediately behind the curved pressure plate 83 which brings it approximately in focus on the screen.

Figure 12:
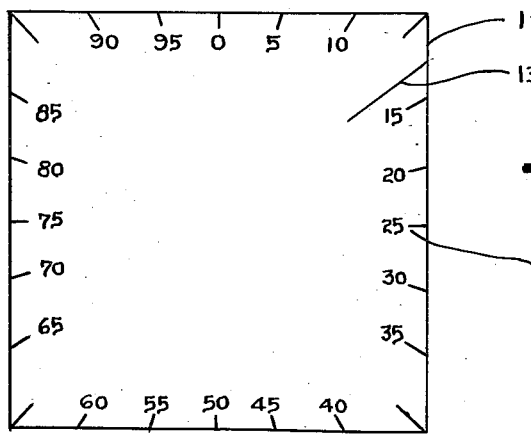
Figure 12 is a diagram of the screen used with the reader when the film indexing means shown in Figures 10 and 11 is employed.

The screen 12 may be marked around its edges, as indicated at 141, Figure 12, and, as film is traversed through the reader, the image 139a of the pointer 139 moved by the ring gear 136 will move about the edge of the screen where the markings 141 occur and thereby indicate the number of feet of film traversed.

By indexing the film on the reels, such as 120, any desired image can be readily located.

While the pointer 139 is shown as moved in timed relation to the feeding shaft 97L by motor 98L it will be observed that the pointer can be connected to and moved by any other part of the reader, or even by some other source of power, as long as the pointer is moved so that the image 139a thereof traverses the indicia 141 on screen 12 in some fixed relation to the traversal of film across the optical path 140 of the reader.

The object of the mechanism shown in Figures 10 to 12, inclusive, is to translate the linear movement of the film into a proportional movement of the projected image of the pointer. The pointer makes one complete revolution on screen 12 for each hundred feet of film moved past the lens.

The gearing arrangement shown and described in connection with Figures 10, 11 is merely illustrative, and obvious details are omitted. The gearing 126, 127, 128, 130, 131 can be mounted below the plate 42 of the turret unit in any suitable manner, and said plate has an aperture through which the upper half 133 of the coupling can extend downward to engage the lower half 132 thereof.

Referring to the circuit diagram, Figure 13, as previously mentioned, the turret head has a terminal rack 57 to which the lamp 65 and motors 98R and L and 115R and L are connected.

From rack 57, cable 56—55 extends to the socket 50 and to the lower front portion 17 of the cabinet. Here, the conductors in the cable can be connected directly to the terminals of switches 18, 19, 20, 21, 22a and resistors 22, 23, or these or any other devices located in the cabinet can first be connected to the terminal rack 38 and the conductors in cable 55 connected to the rack.

By the latter method, all the switches, etc., in the cabinet are connected to rack 38 and this equipment may be tested as a unit, then, the cable 55, 56 merely connects the two racks 38, 57 and the power socket 50. This simplifies connecting and testing.

In order to simplify the drawing, the rack terminals for the switches and resistors are not shown. It will be understood, however, that all apparatus in the turret head is connected to rack 59, and all apparatus in the cabinet to rack 38, if such racks are used as described. The push-button switches 18, 19 may be connected to the control cable 59 for removal from the cabinet, as previously mentioned, and the terminals 38 for this cable are shown in the circuit diagram.

The apparatus being constructed, assembled and wired up as above, the operation of same will be observed from the following.

Referring to Figure 9, the full reel of film containing film 85 is usually placed on the left hand spindle 114L. Usually, the upper head on this reel is omitted, so that the amount of film on the reel can be observed at all times.

The film 85 is threaded between roller 112 carried by the yoke arm 104L and roller 101 carried by a left hand feeding shaft 97L. The film is then carried from left to right across the face of the pressure plate 83, clockwise around roller 101 on the feeder shaft 97R, against which it is pressed by roller 112 in the yoke arm 104R, and the free end of the film is then wound up on the reel 121 carried on the reel shaft 114R.

The plug 52 connected to the power circuit 53, 54 is inserted into the socket 50 on the cabinet. The lamp switch 20 is closed, thereby illuminating a lamp 65, and motor switch 21 is closed, thereby supplying the take-up motors 115L and 115R with current through the resistor 23. The resistor 23 is adjusted to supply the take-up motors with sufficient current to properly tension the film 85 against the pressure plate 83 as the motor 115L tends to revolve anti-clockwise and motor 115R tends to revolve clockwise. The motors being equally energized, they do not move the film at this stage of the operation.

It will be observed that the traverse motors 98L and 98R are also connected to one side of the power circuit via switch 21 and resistor 23, and if now, for example, the left hand push-button 18 is depressed, the circuit through take-up motor 115L will be broken and the circuit through traverse motor 98R will be completed, while the circuit through the take-up motor 115R remains energized. Accordingly, take-up motor 98R begins to move the film 85 to the right (Figure 9), the film being gripped between rollers 101 and 112 while the reel 121 is revolved clockwise, thereby winding up the film fed to the right. This causes the image projected to the screen 12 to traverse the screen to the left, which is in the direction of the left push-button 18, which is depressed.

The operator scans the moving images and when the proper one is reached, merely releases the push-button 18, whereby both take-up motors 115L and 115R being energized, the motion of the film is promptly stopped, and the desired "frame" or image on screen 12 can be observed, as long as desired.

If the right hand push-button 19 is depressed, the operation just described is reversed, that is to say, the take-up motor 115R is de-energized, the left hand traverse motor 98L is energized, the film is wound to the left and between rollers 101 and 112 on shafts 97L and 104L, respectively, and is wound on reel 120 on shaft 114L, which is rotated by the left hand take-up motor 115L.

When the film moves to the left, as just described, the images on screen 12 will apparently move to the right in the direction of the right hand button 19 being pressed.

During the normal operation of the film feeding and reeling operations as just described, the resistor 23 is set to permit the images flowing on the screen 12 to be quickly observed. That is to say, the linear rate of travel of the film is fairly rapid.

However, in many instances it is desired to have the images traverse the screen at a much slower speed than that attained during the normal operation just described. Such slow speed operation is often desirable in connection with editing the films in which changes, such as a re-take of the original copy, are necessary, and in order to provide for this condition traverse switch 22a may be thrown to the right or left, thereby introducing a resistor 22 in series with either the right or left traverse motor, depending on the direction in which the traverse switch 22a is thrown.

Assuming for the sake of illustration that the traverse switch 22a is thrown to the left, it will be seen that the additional resistance afforded by the resistor 22 is now placed in series with the left traverse motor 98L. This motor 98L being energized, will move the film 85 to the left, as previously described, and while both the take-up motors 115L and 115R are energized, take-up motor 115L, which is associated with the traverse motor 98L, will be free to wind up film on its associated reel, because the film so wound is moved to the left by the traverse motor 98L, as previously described.

Throwing the traverse switch 22a to the right merely reverses the operation just described, in that traverse motor 98R will be energized and the film fed thereby will be wound up on the reel mounted on the shaft of take-up motor 115R.

It will be noted from the foregoing that when the traverse switch 22a is used, the push-buttons 18 and 19 are not employed, but that the images will slowly move across the screen 12 from right to left, depending on the position of the traverse switch 22a, and that by adjusting the resistor 22, the speed at which the images move may be adjusted within desired limits.

It will be observed from the foregoing that the traverse motors 98L and 98R constitute a feeding means adapted to move film in the optical path of a lens and that the take-up motors 115L and 115R, respectively, constitute reeling means adapted to receive and wind film moved by the feeding means and it will be observed that by the use of the two take-up motors herein described, that a proper tension is maintained on the film at all times during the reeling and winding operations, without subjecting the film to any undue strain, and that the take-up motors operate to wind up film supplied by the traverse motors without permitting any slack or bight to accumulate between the feed rollers 101, 112 and the reels 120, 121, and that such slack is eliminated when the reader is started, stopped and reversed, and no sudden jerks are transmitted to the film to damage the same.

By means of the knob 109 the turret may be readily revolved in order to bring images on the film right side up on the screen 12. It will be noted that the axis of the turret coincides with the axis of the lens, so that if an image appears on the screen—for example, the image of a letterhead with the top lying along the left hand side of the screen, by revolving the turret in a manner that will be obvious, the top of the image can be brought to the top of the screen.

Any suitable means, such as a stop pin (not shown) may be placed in the turret to engage another pin on the frame to prevent the turret from being turned more than one hundred and eighty degrees, which will prevent winding the cable connecting the turret and the cabinet.

Employing feeding rollers 101, one of which is connected to one motor and the other of which is connected to another motor, we are able to drive the film at a constant rate and due to this arrangement, we are able to maintain the film firmly in contact with the curved glass pressure plate and thus are able to get a clear, sharp image projected on the screen, due to the fact that the depth of focus of the objective lens is sufficient to compensate for the slight curvature of the glass pressure plate. The pressure rollers 112 firmly hold the film in engagement with the feeding rollers 101, due to the fact that the roller 101 which is advancing the film is driven by its own individual motor and the motor associated with the other feeding roller has its individual motor, which acts as a brake. When one of the feeding rollers is driving the film, the other is braking it. Now, in order to take up the used film from the array of feeding and pressure rollers, we have a separate motor on the take-up reel and another motor on the supply reel. When the take-up reel is driven to take up the film delivered by the array, the motor on the supply reel acts as a brake, with the result that the film is gently fed to the array.

By the above arrangement, any tendency to form lines in the projected images due to vibration, the alternations in the current supply to the motors, etc., in any other method, is eliminated in our arrangement, because of the fact that the array of feeding and pressure rollers appear at what would otherwise be nodal points in the film, thereby eliminating any tendency for such vibration to effect the projected image.

It will also be observed from the foregoing description that the machine is exceedingly easy to operate and that as the images traverse the screen in the direction of whichever push-button 18 or 19 is pressed, the operation of the machine is natural and automatic on the part of the operator.

It will also be seen that there are no complicated mechanical parts mounted upon or below the turret plate 42 in order to drive the film in either direction and to wind the same.

In respect to the operation of the indexing device shown in Figures 10 to 12, inclusive, it is believed that the operation of the same will be clear from the foregoing description of the construction of this attachment, for the operation of the reader as just described is no different when the said indexing attachment is used.

What is claimed is:

1. In a device having a lens, a film support, feeding means to move a film in the optical path of said lens having a roller engaging said film to press same into engagement with said support while said film is in motion and being projected, a motor connected to said roller to drive same, reeling means to receive and wind film moved by said feeding means, a motor connected to said reeling means, and a circuit having a source of current for simultaneously operating said motors to feed and wind said film.

2. In a device having a lens, film feeders adjacent said lens and adapted to move film transverse the axis thereof, feeding motors connected to said feeders, reeling devices associated with each of said feeders and adapted to receive film fed thereto by said feeders, reeling motors connected to said reeling devices, a circuit including a source of current for supplying current to all said motors, and switching means in said circuit for simultaneously energizing one of said feeding motors and de-energizing one of said reeling motors.

3. The device as claimed in claim 2 including a support on which said lens, feeders and reeling devices are mounted in cooperative relationship.

4. The device as claimed in claim 2 including a cabinet and a screen forming a wall thereof and wherein a revolvable support is mounted on said cabinet and carries said lens, feeders and reeling devices.

5. The device as claimed in claim 2 including a cabinet and a screen forming a wall thereof and wherein a revolvable support is mounted on said cabinet and carries said lens, feeders and reeling devices, and a lamp for illuminating film fed past said lens by said feeders whereby images on the film may be projected via said lens to said screen.

6. In a device having a lens, a film feeder positioned at each side of the optical axis of said lens and adapted to move a film transverse said axis, feeding motors connected to said feeders to drive same in either direction, reeling means for each of said feeders adapted to receive and wind film moved by said feeders, reeling motors connected to each of said reeling means, a circuit including a source of current for energizing said motors, and switching means in said circuit for simultaneously energizing one of said feeding motors and de-energizing one of said reeling motors.

7. In combination, a rotatable turret plate, a lens mounted on said plate and having its optical axis perpendicular to the plane thereof, a lamp carried by said plate, means for directing a beam of light from said lamp into said lens, a film support in the optical path of said lens, film feeding means mounted on said plate for feeding film across the optical path of said lens while the film is spaced therefrom by said support, means comprising motors having a fixed direction of rotation carried by said plate for operating said film feeding means in either direction to move said film in opposite directions across the optical path of said lens, a circuit including a source of current for energizing said motors, and switching means in said circuit for connecting either of said motors thereto to be operated thereby.

8. In combination, a rotatable turret plate, a lens mounted on said plate and having its optical axis perpendicular to the plane thereof, a lamp carried by said plate, means for directing a beam of light from said lamp into said lens, a film support in the optical path of said lens, film feeding means for feeding film transverse the optical path of said lens while the film is spaced apart therefrom by said support, motor means carried by said plate for operating said feeding means, film reels carried on said plate and adapted to wind film received from said feeding means, and motor means carried by said plate for operating said reels.

9. In combination, a rotatable turret plate, a lens mounted on said plate, film feeders having rotatable shafts extending through said plate, motors supported on the underside of said plate and connected to said shafts to drive the same, reeling devices for each of said feeders mounted on the upper side of said plate and having rotatable shafts extending therethrough, and motors supported on the underside of said plate and connected to said last shafts to drive the same, whereby film moved past said lens by said feeders may be wound off one of said reeling devices and on to the other of said devices.

10. The combination as claimed in claim 9 wherein a tensioning means mounted on the upper side of said turret plate is positioned to engage a film between each of said film feeders and its associated reeling device.

11. In combination, a cabinet, a turret plate revolvably mounted thereon, a lens carried by said plate, film feeders carried by said plate including rotatable shafts and adapted to move film transverse the axis of said lens, feeding motors carried by said plate and connected to said shafts, reeling devices including rotatable shafts carried by said plate and adapted to reel film delivered to said devices by said feeders, reeling motors carried by said plate and connected to the shafts of said reeling devices, a circuit including a source of current for supplying current to all said motors, and switching means in said circuit for simultaneously energizing one of said feeding motors and de-energizing one of said reeling motors.

12. In a device of the character described, a cabinet having an opening in its top wall, a circular track about said opening, a turret plate overlying said opening and having downwardly depending bearing members adapted to revolvably support said plate on said track, means located within said cabinet and underlying said track and extending downwardly from said plate for holding said plate and track in engagement to prevent upward movement thereof while permitting said plate to revolve on said track, means for projecting an image carried on said plate, and a screen on a wall of said cabinet to which an image can be projected by said means.

13. In a device of the character described, a plate having an aperture therein, means carried by said plate for projecting a beam of light parallel to the face of said plate and perpendicular to the axis of said aperture therein, said means including a lamp and a condensing lens, a plurality of hollow studs in said plate adjacent said aperture and suitably spaced thereabout to position a lens with its optical axis concentric with the axis of said aperture, the upper faces of said studs projecting above said plate and said faces being substantially parallel to the axis of said light beam, a mirror-lens unit comprising a flanged casing having pins projecting downward from said flange and adapted to fit into said hollow studs to position said unit relative to the aperture in said plate and said light beam, an inclined mirror in said unit adapted to deflect said beam of light downwardly through said apertured plate, and a lens in said unit in the path of the emergent beam from said mirror.

14. In a device of the character described, a support, a lens on said support, means carried by said support for feeding film across the optical path of said lens including individual motors spaced apart from the optical axis of said lens and having shafts parallel to said axis, means on said shafts for engaging a film to move same, and winding means carried by said support including individual motors spaced apart from the optical axis of said lens having shafts parallel to said axis, and means on said shafts for winding film moved by said feeding means.

15. The combination as claimed in claim 14, wherein said support is revolvable and said lens is positioned thereon with its axis at the axis of the support.

16. The combination as claimed in claim 14, wherein said support carries means for projecting images from a film to be fed and wound by said feeding and winding means.

17. The combination as claimed in claim 14, wherein said support carries means for projecting images from a film to be fed and wound by said feeding and winding means and said support is mounted on a cabinet having a screen adapted to receive images projected by said projecting means.

18. In a device of the character described, film feeding means including a pair of motors adapted when energized to tension a film extending between them, circuits including said motors and a source of current, film winding means including a pair of motors adapted when energized to wind film in opposite directions, said motors being connected to said source of current, and means for conjointly controlling said motors whereby one of each pair thereof may be simultaneously operated to feed and wind film.

19. The combination as claimed in claim 18, including a variable resistance connected to said feeding motors whereby the torque of same may be varied.

20. The combination as claimed in claim 18, including a variable resistance connected to all said motors whereby the torque of same may be varied.

21. The combination as claimed in claim 18, including a variable resistance connected to all said motors whereby the torque of same may be varied, and a second variable resistance and switching means therefor whereby same may be connected to either of said feeding motors to further vary the torque thereof.

22. In a device of the class described, film feeding means including a pair of motors connected in opposition and adapted to tension a film extending therebetween, film winding means including a pair of motors adapted to wind film delivered by said feeding means, circuits connecting all said motors to a source of power, and control means in said circuits whereby either of said feeding motors may be energized while both said winding motors are energized to permit film to be fed by the energized feeding motor and tensioned by one of said winding motors.

23. The combination as claimed in claim 22, including a resistance and switching means therefor whereby same may be connected to either of said feeding motors to vary the torque thereof.

VERNEUR E. PRATT.
GEORGE F. GRAY.

REFERENCES CITED

The following references are of record in the file of this patent:

UNITED STATES PATENTS

| Number | Name | Date |
| --- | --- | --- |
| 1,889,575 | Sebille | Nov. 29, 1932 |
| 2,037,705 | Chapman | Apr. 21, 1936 |
| 2,076,853 | McClure | Apr. 13, 1937 |
| 2,177,638 | Draeger | Oct. 31, 1939 |
| 2,201,376 | Prins | May 21, 1940 |
| 2,231,765 | Landrock | Feb. 11, 1941 |
| 2,255,771 | Golay | Sept. 16, 1941 |
| 2,279,463 | Hopkins | Apr. 14, 1942 |
| 2,316,780 | Foster et al. | Apr. 20, 1943 |
| 2,332,810 | Place | Oct. 26, 1943 |
| 2,404,189 | Place | July 16, 1946 |